(12) United States Patent
Takeuchi et al.

(10) Patent No.: US 8,444,199 B2
(45) Date of Patent: May 21, 2013

(54) VEHICULAR BOX STRUCTURE

(75) Inventors: Makoto Takeuchi, Takanezawa-machi (JP); Hiroshi Izawa, Takanezawa-machi (JP)

(73) Assignee: TS Tech Co., Ltd., Asaka-Shi (JP)

( * ) Notice: Subject to any disclaimer, the term of this patent is extended or adjusted under 35 U.S.C. 154(b) by 481 days.

(21) Appl. No.: 12/246,376

(22) Filed: Oct. 6, 2008

(65) Prior Publication Data

US 2009/0079214 A1    Mar. 26, 2009

(30) Foreign Application Priority Data

Aug. 27, 2007  (JP) ................................. 2007-219636

(51) Int. Cl.
*B60N 3/12*  (2006.01)

(52) U.S. Cl.
USPC ...................................... 296/37.8; 296/24.34

(58) Field of Classification Search
USPC ............................ 296/37.1, 37.8, 24.34, 24.3
See application file for complete search history.

(56) References Cited

U.S. PATENT DOCUMENTS

| | | | | |
|---|---|---|---|---|
| 6,688,487 B2 * | 2/2004 | Oakes et al. | | 220/788 |
| 7,748,762 B2 * | 7/2010 | Mayne, Jr. | | 296/24.34 |
| 2004/0045966 A1 * | 3/2004 | Von Holdt, Jr. | | 220/276 |
| 2008/0041858 A1 * | 2/2008 | Furlong et al. | | 220/378 |

FOREIGN PATENT DOCUMENTS

| | | |
|---|---|---|
| JP | 63-158445 U | 10/1988 |
| JP | 2-106909 U | 8/1990 |
| JP | 9-151923 A | 6/1997 |
| JP | 10-315836 | 12/1998 |
| JP | 2005-119474 A | 5/2005 |
| JP | 2005-280635 | 10/2005 |
| JP | 2007-145077 | 6/2007 |

* cited by examiner

*Primary Examiner* — Glenn Dayoan
*Assistant Examiner* — Melissa A Black
(74) *Attorney, Agent, or Firm* — McDermott Will & Emery LLP

(57) ABSTRACT

An upper cover has an engagement edge, a bottom cover has a receiving edge where the engagement edge is inserted, and the engagement edge is inserted into the receiving edge. The receiving edge has a groove where the leading end of the engagement edge is inserted, the engagement edge has a stopper surface, which serves as a stopper part, on the outer surface toward the basal end side, and the groove has a stopper receiving surface, which serves as a stopper receiving part and catches the stopper surface, on one side internal surface toward the basal end side. As the leading end of the engagement edge is inserted into the groove of the receiving edge and the stopper surface is caught by the stopper receiving surface, the engagement edge of the upper cover and the receiving edge of the bottom cover are joined together without any separation.

5 Claims, 5 Drawing Sheets

PRIOR ART

VEHICULAR BOX STRUCTURE

CROSS-REFERENCE TO RELATED APPLICATION

This application is related to Japanese Patent Application No. 2007-219636, filed on Aug. 27, 2007, which is hereby incorporated by reference herein in its entirety.

BACKGROUND OF THE INVENTION

1. Field of the Invention

The present invention relates to a vehicular box structure provided inside a vehicle.

2. Description of the Related Art

Various kinds of box structures are used inside a vehicle. For example, Unexamined Japanese Patent Application No. 2005-280635 discloses a box structure having an upper lid and a bottom lid latched together and provided at the center console of a vehicle (see paragraph 0022). Unexamined Japanese Patent Application No. H10-315836 discloses a storage box removably provided on a floor. Further, there is a box structure provided below a vehicular seat.

According to Unexamined Japanese Patent Application No. 2007-145077, a box structure has first side member and second side member engaged with each other to assemble a box.

FIG. 5 shows an example of such engagement structure of those members, and a box body 101 made of synthetic resin or the like has an upper member 102 and a lower member 103 which are joined together. The upper member 102 has a plurality of protrusive pieces 104 formed at the bottom end and protruding in the lengthwise direction of the bottom end with predetermined intervals, and an engagement piece 105 having an engagement hole 106 is protrudingly provided between adjoining protrusive pieces 104.

The lower member 103 has a vertical rib 107 on the inner surface of an upper edge 103F corresponding to the protrusive piece 104, and the protrusive piece 104 is inserted between the vertical rib 107 and the upper edge 103F to regulate the positioning of the protrusive piece 104 in the inside-outside direction. The lower member 103 further has an engagement pawl 108 on the inner surface of the upper edge 103F and the engagement pawl 108 has an oblique guide rib 109 on the upper portion, and the engagement piece 105 is inserted inside the upper edge 103F to cause the engagement piece 108 to engage with the engagement hole 106, thereby preventing the upper and lower members 102, 103 from separating from each other.

According to the engagement structure shown in FIG. 5, because the vertical rib 107 and the engagement pawl 108 are alternately provided corresponding to the pieces 104, 105, shrinkage and waviness may be formed on the outer surface of the lower member 103 where the vertical rib 107 and the engagement pawl 108 are provided when molded, thereby degrading the commercial value. Moreover, because of the structure where the plurality of engagement pawls 108 are provided with intervals in the lengthwise direction of the upper edge, assembling becomes difficult if the plurality of engagement pawls 108 and the engagement pieces 105 are not engaged simultaneously, due to the individual dimensional accuracy of the engagement pieces 105 which engage with the respective engagement pawls 108. Furthermore, there is a tendency that the accuracy of engagement after assembling and the joining strength may vary.

The present invention has been made in view of the foregoing problems, and it is an object of the present invention to provide a vehicular box structure which suppresses any formation of local shrinkage and waviness, which facilitates the assembling thereof, and which can achieve a uniform engagement condition at all engaged portions.

SUMMARY OF THE INVENTION

To achieve the object, a vehicular box structure according to the first aspect of the present invention includes a first side member having an engagement edge; second side member having a receiving edge where the engagement edge is inserted, and wherein the receiving edge has a groove where a leading end of the engagement edge is inserted, the engagement edge has a stopper part formed at one side surface toward a basal end side, and the groove has a stopper receiving part, which catches the stopper part and is formed toward a basal end side, on one side inner surface of the groove corresponding to one side surface of the engagement edge.

According to the second aspect of the present invention, the groove may be provided with a press-contact part which contacts the leading end of the engagement edge in a pressed manner.

According to the third aspect of the present invention, the engagement edge has an inclined surface formed on one side surface, and is formed so as to become thin toward the leading end thereof.

According to the fourth aspect of the present invention, a stepped portion is formed between a basal end of one side surface of the engagement edge and one side surface of the first side member.

According to the fifth aspect of the present invention, a leading end position of one side inner surface of the groove is further apart from second side member than a leading end position of another side inner surface of the groove, and the stopper receiving part is formed at the leading end of the one side inner surface.

According to the sixth aspect of the present invention, both outer surface of the receiving edge are so formed as to be flat to inner and outer surfaces of second side member, respectively.

According to the present invention, it is possible to provide a vehicular box structure which suppresses any formation of local shrinkage and waviness, which facilitates the assembling thereof, and which can achieve a uniform engagement condition at all engaged portions.

BRIEF DESCRIPTION OF THE DRAWINGS

FIG. 1A shows a cross-section having no press-contact part, and FIG. 1B shows a cross-section having a press-contact part;

FIG. 2A shows a cross-section having no press-contact part, and FIG. 2B shows a cross-section having a press-contact part;

FIG. 5A shows a part having a vertical rib, and FIG. 5B shows a cross-section having an engagement pawl.

DETAILED DESCRIPTION OF THE INVENTION

Figure 1A:
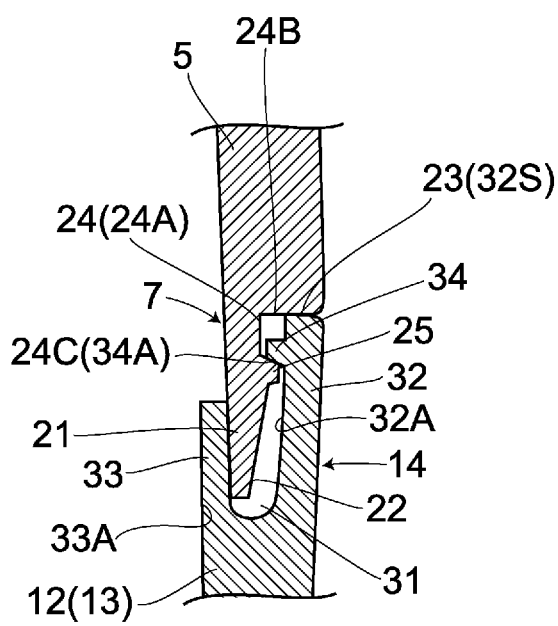
FIGS. 1A and 1B are cross-sectional views showing an insertion state according to an embodiment of the present invention.

An embodiment of the present invention will be explained in detail with reference to the accompanying drawings. The embodiment to be discussed below is not for limiting the scope of the present invention. Some of the structural parts explained below may be unnecessary parts to carry out the present invention set forth in claims. A new vehicular box structure can be obtained by employing a vehicular box structure which is different from conventional box structures, and such a new vehicular box structure will be explained in the following embodiment.

An explanation will be given of the embodiment of the present invention with reference to the accompanying drawings. FIGS. 1 to 4 show the embodiment of the present invention, and as shown in the figures, a box 1 is formed of a synthetic resin or the like, and is constituted by assembling an upper cover 2, which is first side member, and a bottom cover 3, which is second side member. The upper cover 2 has four vertical side plates 5 at the four outer edges of a top plate 4, and the top plate 4 has a recess 6 formed at the frontward center. The recess 6 has a bottom plate 6A and four recess side plates 6B. The top plate 4, the side plates 5, and the recess 6 are integrated together, and the side plates 5 each have an engagement edge 7 at the bottom edge.

The bottom cover 3 is formed in a box-like shape having a bottom, and integrally has a bottom plate 11, three side plates 12 protrudingly provided at the three outer edges of the bottom plate 11, and an inclined side plate 13 protrudingly provided at the rear outer edge of the bottom plate 11 and inclining from the bottom to the top. The side plates 12 each have a receiving edge 14, which is formed at the opened edge of the side plate and into which the engagement edge 7 is inserted. The engagement edge 7 and the receiving edge 14 can be provided around the entire periphery of the covers 2, 3 except a corner part. The cross-sections of the engagement edges 7 are continuously formed at the edges of the upper cover 2, and the cross-sections of the receiving edges are continuously formed at the edges of the bottom cover 3. Note that a plurality of vertical ribs 16 are formed at the inner surfaces of the side plates 12, 13 of the bottom cover 3 and the bottom plate 11 thereof for reinforcement.

Figure 4:
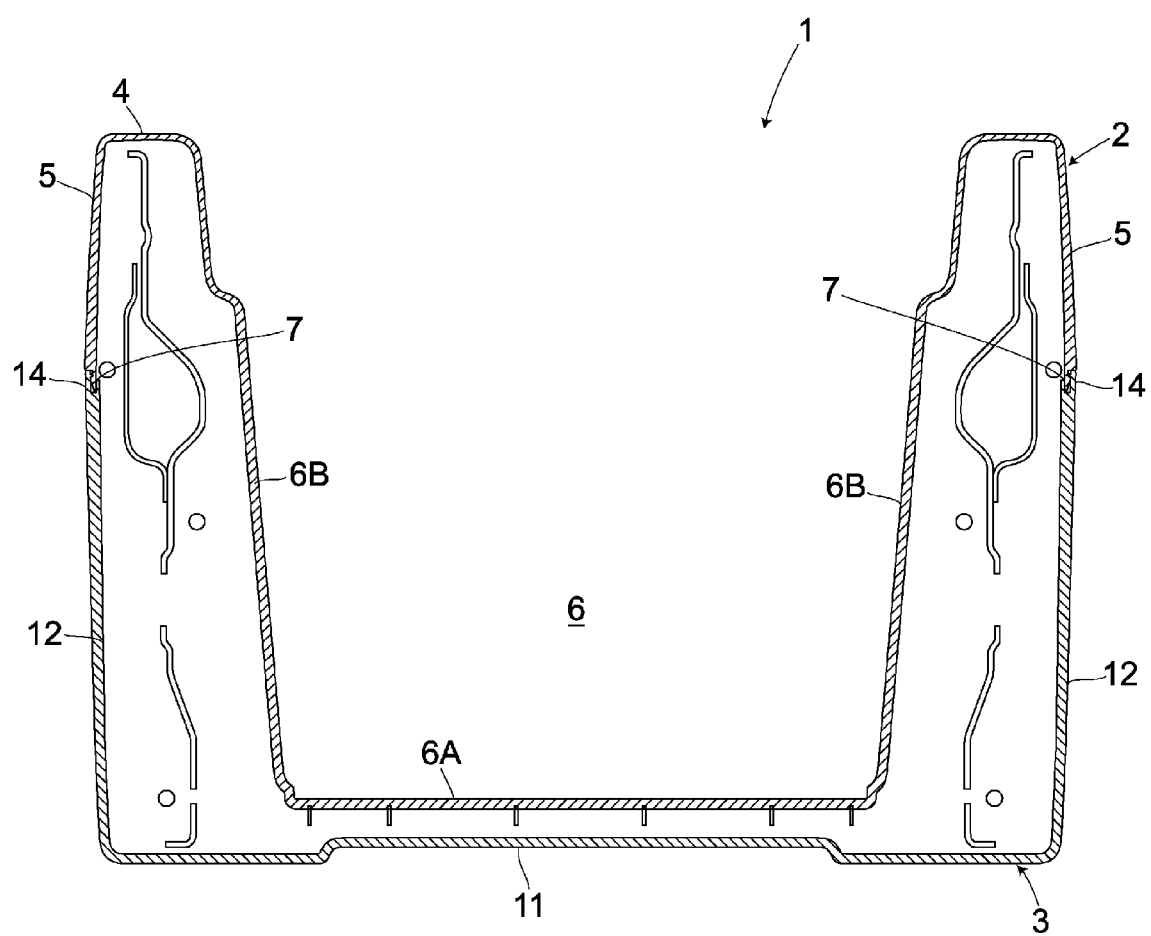
FIG. 4 is a cross-sectional view showing the main parts of the box.
Figure 5A:
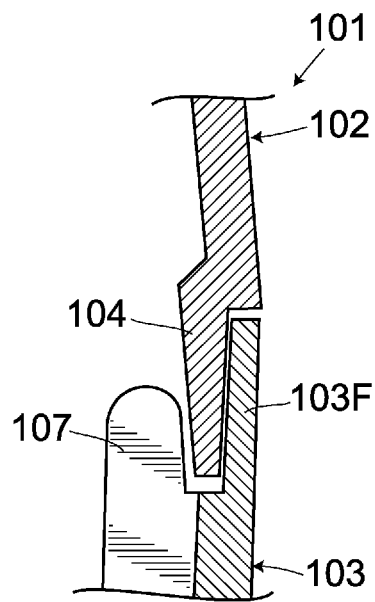
FIGS. 5A and 5B are cross-sectional views showing a conventional engagement structure.
Figure 5B:
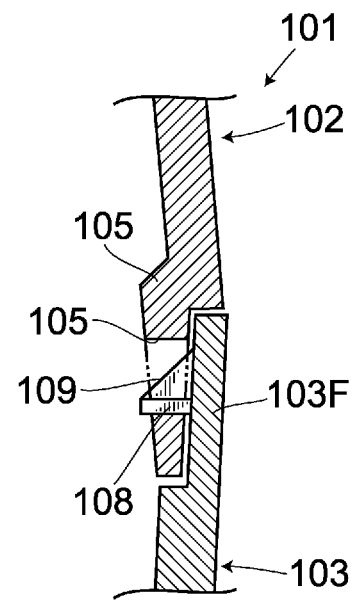

As shown in FIG. 4, as the engagement edges 7 are inserted into the respective receiving edges 14 for engagement and joining, the recess 6 of the upper cover 2 is received in the bottom cover 3, and the box 1 is assembled.

Next, the details of the engagement edge 7 and the receiving edge 14 will be explained.

Note that a word "one side" in the following paragraph means the inner surface side of the upper cover 2 at the side plate 5, and a word "another side" means the outer surface side of the upper cover 2 at the side plate 5.

As shown in FIGS. 1 and 2, the engagement edge 7 is so formed as to become thin toward a leading end part 21, and has an inclined surface 22 at the outer surface which is the one side surface. A stepped portion 23 is formed between the inclined surface 22 and the outer surface of the side plate 5 of the upper cover 2, which is one side surface. On the other hand, the inner surface of the engagement edge 7, which is another side surface, is continuously formed with the inner surface of the side plate 5, which is another side surface. An engagement groove 24 is formed at the basal end of the inclined surface 22 which is one side surface, and the engagement groove 24 has a bottom surface part 24A, a side surface part B continuous from the stepped portion 23 at the basal end side, and a stopper surface 24C which serves as a stopper part inclining from the bottom surface part 24A toward the outer leading end side. The stopper surface 24C faces the basal end side of the engagement edge 7. A protrusion 25 continuous from the stopper surface 24C is protrudingly formed between the inclined surface 22 and the engagement groove 24, and a stepped portion 25A is formed between the protrusion 25 and the inclined surface 22.

Note that a word "one side" in the following paragraph means the outer surface side of the bottom cover 3 at the side plates 12, 13, and a word "another side" means the inner surface side of the bottom cover 3 at the side plate 12.

The receiving edge 14 is so formed as to be thicker than the bottom edge of the upper cover 2, and has a groove 31 at the center of the thickness direction. One side plate 32 and another side plate 33 are formed at one side of the groove 31 and another side thereof, respectively, and the inner surface of one side plate 32 functions as one side inner surface 32A, and the inner surface of the another side plate 33 functions as another side inner surface 32B at the groove 31. A leading end 32S of one side plate 32 is located at a position apart from the leading end of another side plate 33. The leading end position of one side inner surface 32A is further apart from the bottom cover 3 than the leading end position of another side inner surface 32B at the groove 31. An engagement protrusion 34 which is inserted into the engagement groove 24 is protrudingly formed at the basal end side of one side inner surface 32A, and a stopper receiving surface 34 which receives the stopper surface 24C is formed at the basal end side of the engagement protrusion 34. The stopper receiving surface 34A faces the basal end side of the receiving edge 14. The engagement protrusion 34 has a recess 34B formed at the leading end side thereof.

Figure 2A:
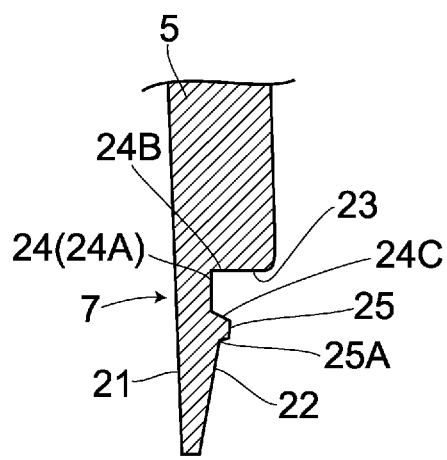
FIGS. 2A and 2B are cross-sectional views prior to insertion.
Figure 2A:
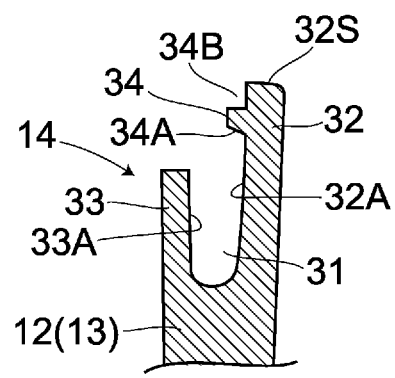
Figure 2B:
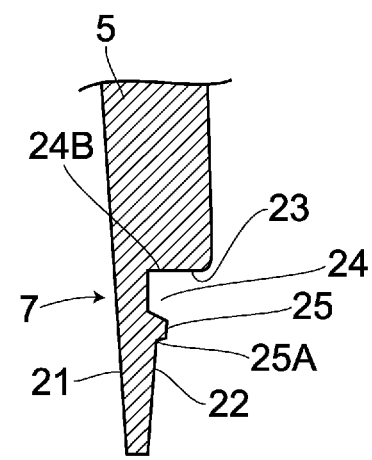
Figure 2B:
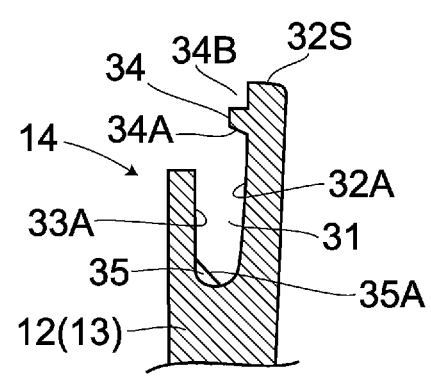
Figure 3:
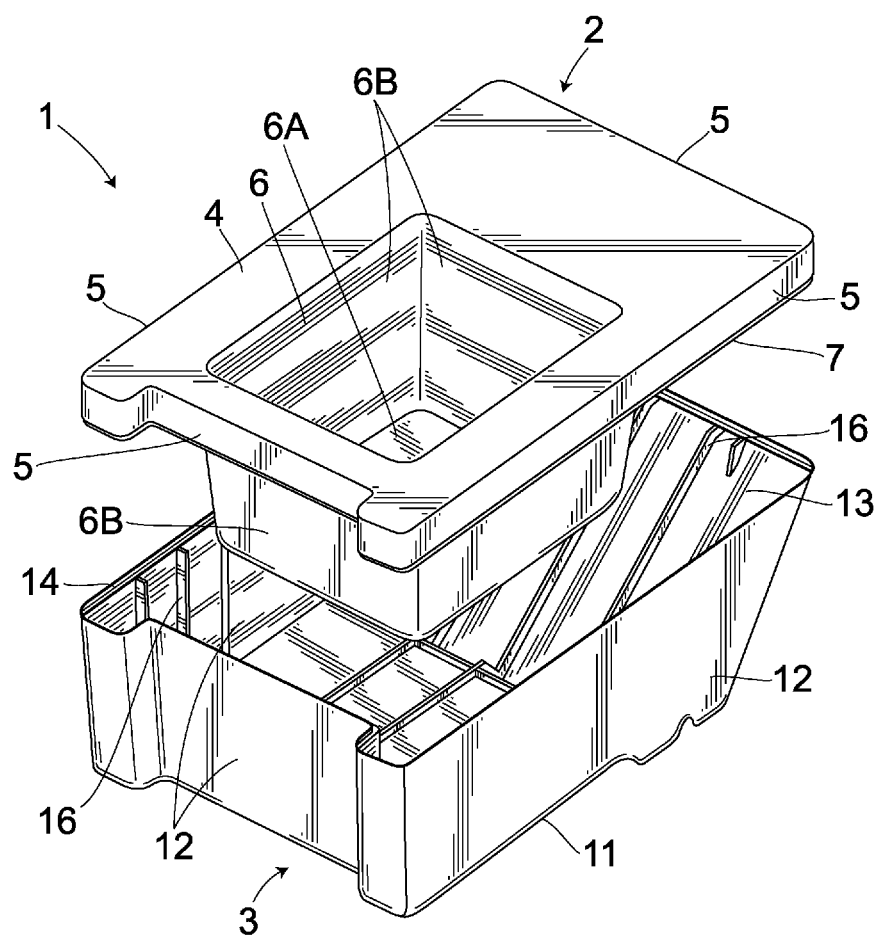
FIG. 3 is an exploded perspective view of a box.

As shown in FIGS. 1A and 2B, the groove 31 has a rib 35, which is formed at the bottom surface thereof and contacts the leading end part 21 in an engaged condition. The rib 35 has an inclined part 35A which contacts another side corner part of the leading end part 21. The inclined part 35A is obliquely provided in a direction orthogonal to the insertion direction of the engagement edge 7, and the plurality of ribs 35 are provided at the continuous respective receiving edges 14 at predetermined intervals.

Figure 1B:
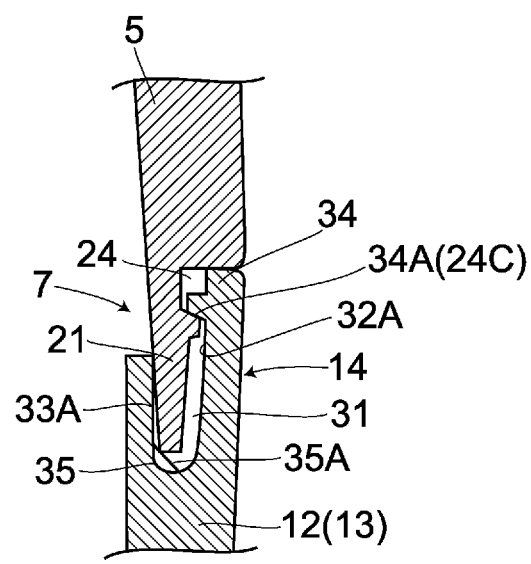

Next, the effect of the foregoing structure will be explained. As the leading end of the engagement edge 7 is inserted into the groove 31 of the receiving edge 14 in such a way that the bottom edge of the upper cover 2 is inserted into the opened edge of the bottom cover 3, the inclined surface 22 slides over the leading end of the engagement protrusion 34, and as the leading end part 21 is inserted into the groove 31, the stepped portion 25A of the protrusion 25 abuts the engagement protrusion 34. The dimension of the stepped portion 25A in the height direction is slight, and as the engagement edge 7 is further pressed in, one side plate 32 and another side plate 33 spread, and as shown in FIG. 1A, the engagement protrusion 34 is engaged and inserted into the engagement groove 24, and the stopper surface 24C which serves as the stopper part is caught by the stopper receiving surface 34C which serves as the stopper receiving part. As shown in FIG. 1B, at the rib 35 partially provided on the receiving edge 14, one side corner part of the leading end part 21 contacts the inclined part 35A of the rib 35 in a pressed manner, so that the leading end part 21 is pushed toward the basal end side, and the stopper surface 24C and the stopper receiving surface 34A contact with each other in a pressed manner, and thus both surfaces are not likely to be separated from each other.

The engagement edges 7 and the receiving edges 14 are continuously provided at the side plates 5 and the side plates 12, 13, respectively, and more preferably, those edges are provided around all periphery other than a corner part of the covers 2, 3, so that a uniform engagement condition can be achieved in comparison with conventional partial engagement structure accomplished by engagement at some portions, thereby facilitating assembling. Because the engaged portions are not partially provided but provided around all periphery of the cover 2, 3, formation of partial shrinkage and waviness can be suppressed.

As explained above, according to the embodiment, the vehicular box structure of the present invention has the upper cover 2 which serves as first side member and has the engagement edges 7, the bottom cover 3 which serves as second side member and has the receiving edges 14 where the engagement edges 7 are inserted, and the engagement edges 7 are inserted into the receiving edges 14, wherein the receiving edge 14 has the groove 31 where the leading end of the engagement edge 7 is inserted, the stopper surface 24C which is the stopper part facing the basal end side is provided at the outer surface of the engagement edge 7 which is one side surface, and the stopper receiving surface 34A, which catches the stopper surface 24C and serves as the stopper receiving part facing the basal end side, at one side inner surface 32A of the groove 31 corresponding to the outer surface of the engagement edge 7. Therefore, as the leading end of the engagement edge 7 is inserted into the groove 31 of the receiving edge 14 to engage the stopper surface 24C and the stopper receiving surface 34A with each other, the engagement edge 7 of one side cover 2 and the receiving edge 14 of another side cover 3 are joined together without any separation. According to this structure, it is not necessary to partially provide any vertical rib and pawl, so that it is possible to suppress any formation of shrinkage and waviness when the covers are molded. Moreover, as the leading end of the engagement edge 7 engages the groove 31 and is joined together, a uniform engagement can be achieved unlike partial and local engagement. Moreover, according to the embodiment, as the inclined part 35A which contacts the leading end of the engagement edge 7 in a pressed manner is provided at the groove 31, the stopper surface 24C contacts the stopper receiving surface 34A in a pressed manner, thereby suppressing any separation of the stopper receiving surface 34A and the stopper surface 24C.

Further, according to the embodiment, the inclined surface 22 is formed on the outer surface of the engagement edge 7 which is one side surface, and the engagement edge 7 is formed so as to become thin toward the leading end thereof, so that engagement of the stopper receiving surface 34A and the stopper surface 24C becomes smooth because of the shape becoming thin toward the leading end and the guide effect by the inclined surface 22.

Still further, according to the embodiment, because the stepped portion 23 is formed between the basal end of the outer surface of the engagement edge 7, which is one side surface, and, the outer surface of the upper cover 2, which is one side surface, the insertion dimension of the engagement edge 7 into the groove 31 can be regulated as the leading end 32S of the receiving edge 14 abuts the stepped portion 23. That is, when the engagement edge 7 is inserted into the groove 31, the engagement edge 7 is stopped at a position where the leading end 32S of the receiving edge 14 abuts the stepped portion 23, so that no excessive stress is applied to other structural parts.

According to the embodiment, the leading end position of one side inner surface 32A is further apart from the bottom cover 3 which is second side member than the leading end position of another side inner surface 33A of the groove 31, and the stopper receiving surface 34A which is the stopper receiving part is formed at the leading end side of one side inner surface 32A, so that when the leading end of the engagement edge 7 is inserted into the groove 31 and is further inserted, the stopper surface 24C which is the stopper part engages with the stopper receiving surface 34C which is the stopper receiving part, thereby facilitating assembling. Moreover, because the stopper receiving surface 34C is apart from the basal end, one side plate 32 constituting one side inner surface 32A provided with the stopper receiving surface 34C easily deforms, thereby facilitating an insertion work.

According to the embodiment, both outer surfaces of the receiving edge 14 are formed in such a manner as to be flat to the inner and outer surfaces of the bottom cover 3 which is second side member, and the strength of the receiving edge 14 where the engagement edge 7 is inserted becomes stable, thereby ensuring a sufficient strength of a joined portion.

As an additional effect of the embodiment, because the engagement protrusion 34 has the recess 34B formed at the leading end, when the leading end part 21 is inserted into the groove 31, the protrusion 25 is inserted into the recess 34B of the engagement protrusion 34, the stepped portion 25A of the protrusion 25 abuts the engagement protrusion 34, so that the covers 2, 3 are once positioned, and by further inserting the engagement edge 7 after all peripheral edges are positioned, the engagement edge 7 can be smoothly inserted into the receiving edge 14. Furthermore, without the recess 34B, the dimension of the engagement protrusion overleaping the protrusion 25 becomes long, and insertion becomes difficult, but this problem can be solved by having the recess 34B.

The present invention is not limited to the foregoing embodiment, and can be changed and modified in various forms. For example, the bottom cover may have the engagement edges, and the upper cover may have the receiving edges. The vehicular box of the present invention may be provided for a two-wheel vehicle, and when it is applied to a four-wheel vehicle, it is preferable that the box should be provided inside the vehicle.

What is claimed is:

1. A vehicular box structure comprising:
   a first side member having an engagement edge provided around substantially an entire periphery of the first side member; and
   a second side member having a receiving edge where the engagement edge is inserted, the receiving edge being provided around substantially an entire periphery of the second side member, wherein:
   the receiving edge is formed in substantially uniform thickness around substantially an entire periphery thereof and has a groove formed around substantially an entire periphery thereof where a leading end of the engagement edge is inserted,
   the engagement edge has a stopper part formed at one side surface toward a basal end side, the stopper part being formed around substantially the entire periphery of the first side member,
   the groove has a stopper receiving part, which catches the stopper part and is formed toward a basal end side of the groove, on one side inner surface of the groove that corresponds to one side surface of the engagement edge, the stopper receiving part being formed around substantially an entire periphery of the second side member,
   the stopper receiving part is formed at the leading end of the one side inner surface,
   both outer surfaces of the receiving edge are so formed as to be flat to inner and outer surfaces of second side member, respectively, and
   the groove is provided with a press-contact part on another side of the bottom thereof, the press-contact part contacting another side of the leading end of the engagement edge in a pressed manner, so that the stopper part formed on the one side of the engagement edge contacts with the stopper receiving part of the receiving edge in a pressed manner.

2. The vehicular box structure according to claim 1, wherein the engagement edge has an inclined surface formed on one side surface, and is formed so as to become thin toward the leading end thereof.

3. The vehicular box structure according to claim 1, wherein a stepped portion is formed between a basal end of one side surface of the engagement edge and one side surface of the first side member.

4. The vehicular box structure according to claim 2, wherein a stepped portion is formed between a basal end of one side surface of the engagement edge and one side surface of the first side member.

5. A vehicular box structure comprising:
- a first side member having an engagement edge provided around substantially an entire periphery of the first side member other than a corner part thereof; and
- a second side member having a receiving edge where the engagement edge is inserted, the receiving edge being provided around substantially an entire periphery of the second side member other than a corner part thereof, wherein:
- the receiving edge has a groove where a leading end of the engagement edge is inserted, the groove being formed around substantially the entire periphery of the second side member,
- the engagement edge has a stopper part formed at one side surface toward a basal end side, the stopper part being formed around substantially the entire periphery of the first side member,
- the groove has a stopper receiving part, which catches the stopper part and is formed toward a basal end side, on one side inner surface of the groove corresponding to one side surface of the engagement edge, the stopper receiving part being formed around substantially an entire periphery of the second side member,
- the stopper receiving part is formed at the leading end of the one side inner surface,
- both outer surfaces of the receiving edge are so formed as to be flat to inner and outer surfaces of second side member, respectively, and
- the groove is provided with a press-contact part on another side of the bottom thereof, the press-contact part contacting another side of the leading end of the engagement edge in a pressed manner, so that the stopper part formed on the one side of the engagement edge contacts with the stopper receiving part of the receiving edge in a pressed manner.

* * * * *